(12) United States Patent
Nakano et al.

(10) Patent No.: US 8,137,171 B2
(45) Date of Patent: Mar. 20, 2012

(54) GAME RESULT EVALUATION METHOD AND DEVICE

(75) Inventors: Hideyasu Nakano, Kobe (JP); Takuya Kobayashi, Kobe (JP); Yasushi Mito, Kobe (JP); Toyokazu Sakai, Kobe (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 972 days.

(21) Appl. No.: 12/125,686

(22) Filed: May 22, 2008

(65) Prior Publication Data

US 2008/0248847 A1    Oct. 9, 2008

Related U.S. Application Data

(63) Continuation of application No. PCT/JP2006/322536, filed on Nov. 13, 2006.

(30) Foreign Application Priority Data

Nov. 22, 2005    (JP) .................................. 2005-337694

(51) Int. Cl.
*A63F 9/24* (2006.01)
*G06F 13/00* (2006.01)
(52) U.S. Cl. ............ 463/7; 463/9; 463/1; 463/42; 463/8
(58) Field of Classification Search .................. None
See application file for complete search history.

(56) References Cited

U.S. PATENT DOCUMENTS

| | | | | |
|---|---|---|---|---|
| 6,758,746 B1 * | 7/2004 | Hunter et al. | ...................... | 463/9 |
| 7,452,268 B2 * | 11/2008 | Annunziata | ...................... | 463/1 |
| 2002/0082065 A1 * | 6/2002 | Fogel et al. | ...................... | 463/8 |
| 2003/0092492 A1 * | 5/2003 | Ishii et al. | ...................... | 463/42 |
| 2004/0029625 A1 * | 2/2004 | Annunziata | ...................... | 463/1 |

(Continued)

FOREIGN PATENT DOCUMENTS

JP    2000-189673 A    7/2000

(Continued)

OTHER PUBLICATIONS

Extended European Search Report of the corresponding European Application No. 06832548.9, dated Mar. 10, 2011.

(Continued)

*Primary Examiner* — Paul A D'Agostino
(74) *Attorney, Agent, or Firm* — Global IP Counselors, LLP

(57) ABSTRACT

The player is given the further enjoyment after the completion of a game and encouraged to participate in the next game. The relationship between characteristic parameters used for displaying a character and ability parameters of the player that are computed based on the execution of a game is defined for each character. The relationship between the characteristic parameters and the ability parameters is set to be different from character to character. Therefore, a character that the player has selected changes according to a game result. Because the way a character changes differs from character to character, the player is given the enjoyment of finding a character for which he/she can take advantage of his/her play style in addition to the enjoyment given by an actual game. In order to realize this enjoyment, a relationship between the characteristic parameters and the ability parameters of a character is intentionally made secret and unknown to the player when the player selects a character. Therefore, this stimulates the player's motivation to enter the game and encourages the player to actively enter the game in search of a character that is suitable for his/her own habit.

8 Claims, 15 Drawing Sheets

U.S. PATENT DOCUMENTS

2004/0092313 A1    5/2004    Saito et al.
2008/0214311 A1    9/2008    Saito et al.

FOREIGN PATENT DOCUMENTS

| | | |
|---|---|---|
| JP | 2002-102543 A | 4/2002 |
| JP | 2003-225469 A | 8/2003 |
| JP | 2003-290555 A | 10/2003 |
| TW | 227159 B | 2/2005 |

OTHER PUBLICATIONS

Anonymous: "Baldur's Gate II: Shadows of Amn (Game Manual)", BioWare Corp., 2000.

Anonymous: "Vault Dweller's Survival (Fallout Game Manual)", Interplay Productions, 1997.

Chinese Office Action of the corresponding Chinese Application No. 200680043488.X, dated Feb. 11, 2011.

* cited by examiner

| Player ID | Player name | Authentication information | Card ID | Ability parameter accumulated result |
|---|---|---|---|---|
| P0001 | Yamada Taro | yamada | C0001 | (80,60,60,30,50,50) |
| P0002 | Suzuki Jiro | suzuki | C0002 | (20,50,50,60,30,30) |
| ... | ... | jiro | C0020 | (90,80,40,25,70,90) |
| ... | ... | ... | ... | ... |

Fig. 8

| Characteristic parameter name / Character ID | Physical strength | Quickness | Technique | Guts | Luck | Muscular strength |
|---|---|---|---|---|---|---|
| chara1 | 2300 | 2200 | 2300 | 3000 | 2100 | 2100 |
| chara2 | 2100 | 2100 | 2200 | 2300 | 2300 | 3000 |
| chara3 | 2300 | 3000 | 2100 | 2100 | 2200 | 2300 |
| chara4 | 2100 | 2200 | 3000 | 2300 | 2300 | 2100 |
| chara5 | 3000 | 2200 | 2100 | 2100 | 2300 | 2300 |
| chara6 | 2200 | 2100 | 2100 | 2300 | 3000 | 2300 |

| Characteristic parameter name | Ability parameter name | Relational expression |
|---|---|---|
| Physical strength | Life | (Remaining life amount total/life total)x100 |
| Quickness | Difficulty level value | (Difficulty level value total/99* number of stages)x100 |
| Technique | Skill | (Skill point total/100* number of stages)x100 |
| Guts | PERFECT | (Number of PERFECT total/chip total)x100 |
| Luck | Rank | (Rank total/20* number of stages)x100 |
| Muscular strength | Combo | (Maximum combo value total/number of chips total)x100 |

Fig. 11

| Characteristic parameter name / Character ID | Physical strength | Quickness | Technique | Guts | Luck | Muscular strength |
|---|---|---|---|---|---|---|
| chara1 | Life x 1 | Difficulty level value x 1 | Skill x 1 | PERFECT x 1.5 | Rank x 1 | Combo x 1 |
| chara2 | Life x 1 | Difficulty level value x 1 | Skill x 1 | PERFECT x 1 | Rank x 1 | Combo x 1.5 |
| chara3 | Life x 1 | Difficulty level value x 1.5 | Skill x 1 | PERFECT x 1 | Rank x 1 | Combo x 1 |
| chara4 | Life x 1 | Difficulty level value x 1 | Skill x 1.5 | PERFECT x 1 | Rank x 1 | Combo x 1 |
| chara5 | Life x 1.5 | Difficulty level value x 1 | Skill x 1 | PERFECT x 1 | Rank x 1 | Combo x 1 |
| chara6 | Life x 1 | Difficulty level value x 1 | Skill x 1 | PERFECT x 1 | Rank x 1.5 | Combo x 1 |

Fig. 12

GAME RESULT EVALUATION METHOD AND DEVICE

TECHNICAL FIELD

The present invention relates to a game result evaluation method for evaluating a game result obtained by a player performing a game and for displaying an evaluation result.

BACKGROUND ART

A player's motivation to enter a game is encouraged by his/her desire to get more points or to complete a more difficult game stage. A player's motivation to enter a game or to improve his/her skill is also encouraged by showing the position of the player among a group of many other players. Recently, a player can know his/her own nationwide or worldwide ranking based on his/her points by game terminal apparatuses being connected by a network.

At present, it is common to display the ranking of a player that indicates the position of the player's game result at a given store or in a given country. It is expected that a player actively participates in a game aiming for a higher ranking. The display of a player's ranking after the completion of a game does encourage a player's motivation to improve his/her skills, however, it stops short of stimulating the player's desire to play the game again. It is because the display of ranking only shows an absolute evaluation to a player based on his/her game result but does not give any enjoyment as a game after the game is completed.

An object of the present invention is to provide a game result evaluation method that uses a game result and gives any player a motivation to participate in the game again after the game is completed.

SUMMARY OF THE INVENTION

In order to solve the aforementioned problem, Invention 1 provides a game result evaluation method that includes the following steps.

A step of computing a plurality of ability parameters of a player based on an execution of a game;

A step of storing a plurality of characteristic parameters that are correlated with a plurality of characters respectively and used for displaying each character, and initial values thereof;

A step of storing for the each character a relationship between each of the plurality of characteristic parameters of the each character and the plurality of ability parameters computed in the step of game execution;

A step of displaying the plurality of characters based on the initial values of the characteristic parameters prior to the step of the game execution;

A step of concealing the relationship between the plurality of characteristic parameters and the plurality of ability parameters of each character in the step of displaying the characters;

A step of accepting a selection of any of the plurality of characters displayed in the step of displaying the characters;

A step of updating a value of each of the characteristic parameters of a selected character based on the ability parameters of the player computed in the step of the game execution and a relationship between the characteristic parameters of the selected character that is a character selected in the step of accepting the selection and the ability parameters; and A step of displaying the selected character that has visually changed from the selected character displayed in the step of displaying the characters as an execution result of the game based on the value of each of the characteristic parameters updated in the step of updating the characteristic parameters.

Because the way a character changes differs from character to character, the player is given the enjoyment of finding a character for which he/she can take advantage of his/her play style. In order to realize this enjoyment, the relationship between the characteristic parameters and the ability parameters of the character is intentionally made secret and unknown to the player when the player selects the character. When the relationship between the characteristic parameters and the ability parameters that are associated with the selected character matches operational characteristics of the player, a result shows a prominent increase of the characteristic parameters of the character. In a reverse case, a result shows a poor increase of the characteristic parameters of the character. Because such a change in the characteristic parameters of the character is expressed as a change in the way the character is displayed, a game result which reflects a habit of the player becomes obvious to the player. Therefore, this stimulates a player's motivation to enter a game and encourages the player to actively enter the game in search of a character suitable for his/her own habit.

Each of the characteristic parameters of each character is correlated with the ability parameters on a one-to-one basis or a one-to-multiple basis. Each characteristic parameter may be described by a relational expression with the ability parameter as a variable. For example, the characteristic parameters of characters are F1, F2 and F3, and the ability parameters computed in the game execution step are G1, G2 and G3. For example, the characteristic parameters of each character may be described by the following formulas.

Character I: F1=G1, F2=G2, F3=G3

Character II: F1=G1+G2, F2=G2+G3, F3=G3+G1

Further, each relational expression defining each characteristic parameter may be defined in a way that the weighting of the ability parameter is different for each character. For example, the relational expression that defines the characteristic parameters of each character may be defined as follows. In the following, a, b and c are parameters for the weighting.

Character I: F1=a*G1, F2=G2, F3=G3

Character II: F1=G1, F2=b*G2, F3=G3

Character III: F1=G1, F2=b*G2, F3=c*G3

Invention 2 provides the game result evaluation method according to Invention 1 in which the step of storing the characteristic parameters stores for the each character a correlation between each of the characteristic parameters and each of the ability parameters, and a weighting of each of the ability parameters for each of the characteristic parameters. In this method, the step of updating the characteristic parameters updates the value of each of the characteristic parameters based on the correlation and the weighting stored in the step of storing the characteristic parameters. The step of concealing the relationship prevents a direct output of the correlation between each of the characteristic parameters and each of the ability parameters and the weighting per se stored for the each character in the steps of displaying the characters and accepting the selection.

Even if the correlation between each characteristic parameter and each ability parameter is not different for each character, the way characteristic parameters are changed can be made different depending on a character by changing the weighting of the ability parameter for each character even when the same game performance is made. As a result, a characteristic of the game performance can be reflected to the character displayed in the selection accepting step and to a visual change of the character. Note, however, that the direct output of the correlation and the weighting, for example the display of a formula, message, radar chart, graph, etc. is not made. In other words, the correlation between the characteristic parameters and the ability parameters and the weighting of the ability parameters are concealed by basically displaying only the character. The player will discover that the way a character changes differs from character to character and feel enjoyment when the player succeeded in choosing a character that is suitable for him/her. Thus, the player will enjoy the gameability in selecting a character and feel enjoyment pursuing the relationship between a character and its ability parameters.

Invention 3 provides the game result evaluation method according to Invention 1 or Invention 2 in which the step of the game execution outputs names of the plurality of ability parameters during or after the execution of the game. In this method, the step of storing the relationship stores names of the plurality of characteristic parameters that are different from the names of the plurality of ability parameters. Also, the step of concealing the relationship displays a part or all of the names of the plurality of characteristic parameters with the characters displayed in the step of displaying the characters correlated therewith.

The relationship between the characteristic parameters and the ability parameters can be concealed by making their names different from each other. At the same time, the player can assume the relationship between the characteristic parameters and the ability parameters using the names of the characteristic parameters as a clue.

Invention 4 provides the game result evaluation method according to Invention 3 in which the step of storing the characteristic parameters stores for each character an initial value for any one of the characteristic parameters that is relatively greater than that of the other characteristic parameters and a characteristic parameter having a relatively greater value is set to be different for each character. In this method, the step of displaying the characters displays the plurality of characters based on the initial values of characteristic parameters of each character.

An initial value is given to one of the characteristic parameters of each character that is greater than that of the other characteristic parameters. A characteristic parameter to which a relatively greater initial value is given is different from character to character. Therefore, the display manner of the character displayed based on the initial values of the characteristic parameters includes the display manner that reflects the initial values. In this way, the relationship between the characteristic parameters and the ability parameters of each character is indirectly shown to a player and the enjoyment to examine and choose a character will be given to the player.

Invention 5 provides the game result evaluation method according to Invention 3 in which the step of storing the characteristic parameters stores for each character an initial value for any one of the characteristic parameters that is relatively greater than that of the other characteristic parameters and a characteristic parameter having a relatively greater value is set to be different for each character. In this method, the step of concealing the relationship displays a value of characteristic parameter having a relatively greater initial value among the characteristic parameters of each character with its name and a character correlated therewith.

The initial value given to any one of the characteristic parameters of each character is displayed with its name and the character. In this way, the relationship between the characteristic parameters and the ability parameters of each character is indirectly shown to the player and the enjoyment to examine and choose a character will be given to the player.

Invention 6 provides the game result evaluation method according to Invention 3 in which the step of concealing the relationship indicates that a relationship between each characteristic parameter and each ability parameter is different for each character, and outputs text data and/or audio data indicating that the relationship itself is concealed.

The player is informed that the relationship between a character and its ability parameters itself is concealed while keeping the relationship between the two secret. It is expected that this will stimulate a player's motivation to figure out the relationship and encourage the player to enter the game. It is conceivable to output a message such as "Characteristics of the characters are secret. Find out which character suits you!"

Invention 7 provides a game result evaluation device that comprises the following units.

A game execution unit configured to compute a plurality of ability parameters of a player based on an execution of a game;

A characteristic storing unit configured to store a plurality of characteristic parameters that are correlated with a plurality of characters respectively and used for displaying each character, and initial values thereof;

A relationship storing unit configured to store for the each character a relationship between each of the plurality of characteristic parameters of the each character and the plurality of ability parameters computed by the game execution unit;

A characters displaying unit configured to display the plurality of characters based on the initial values of the characteristic parameters prior to the game execution by the game execution unit;

A relationship concealing unit configured to conceal the relationship between the plurality of characteristic parameters and the plurality of ability parameters of each character displayed by the character displaying unit;

A selection accepting unit configured to accept a selection of any of the plurality of characters displayed by the character displaying unit;

A characteristic update unit configured to update a value of each of the characteristic parameters of a selected character based on the ability parameters of the player computed by the game execution unit and a relationship between the characteristic parameters of the selected character that is a character selected by the selection accepting unit and the ability parameters; and A result displaying unit configured to display the selected character that has visually changed from the selected character displayed by the character displaying unit as an execution result of the game based on the value of each of the characteristic parameters updated by the characteristic update unit.

This invention demonstrates the same effects as Invention 1.

Invention 8 provides a game result evaluation program for causing a computer to function as following means.

A game execution means for computing a plurality of ability parameters of a player based on an execution of a game;

A characteristic storing means for storing a plurality of characteristic parameters that are correlated with a plurality of characters respectively and used for displaying each character, and initial values thereof;

A relationship storing means for storing for the each character a relationship between each of the plurality of characteristic parameters of the each character and the plurality of ability parameters computed by the game execution means;

A characters displaying means for displaying the plurality of characters based on the initial values of the characteristic parameters prior to the game execution by the game execution means;

A relationship concealing means for concealing the relationship between the plurality of characteristic parameters and the plurality of ability parameters of each character displayed by the characters displaying means;

A selection accepting means for accepting a selection of any of the plurality of characters displayed by the character displaying means;

A characteristic update means for updating a value of each of the characteristic parameters of a selected character based on the ability parameters of the player computed in the game execution step and a relationship between characteristic parameters of the selected character that is a character selected by the selection accepting means and the ability parameters; and A result displaying means for displaying the selected character that has visually changed from the selected character displayed by the character displaying means as an execution result of the game based on the value of each of the characteristic parameters updated by the characteristic update means.

This invention demonstrates the same effects as Invention 1.

By using the present invention, a player is given the enjoyment of finding a character for which he/she can take advantage of his/her play style because the way the character changes, which reflects a game result of a player is different from character to character.

BRIEF DESCRIPTION OF THE DRAWINGS

FIG. 8 is a conceptual explanatory diagram of personal data stored in a center server;

FIG. 10 is a conceptual explanatory diagram of information stored in a characteristic table;

FIG. 11 is a conceptual explanatory diagram of information stored in a correlation table;

FIG. 12 is a conceptual explanatory diagram of information stored in a coefficient table;

BEST MODE OF IMPLEMENTING THE INVENTION

<Outline of the Invention>

The present invention defines for each character the relationship between characteristic parameters used for displaying a character and ability parameters of a player that are computed based on the execution of a game. The relationship between the characteristic parameters and the ability parameters is defined in a way that it is different for each character. Therefore, a character that a player has selected itself changes according to a game result. Because the way a character changes differs from character to character, a player is given the enjoyment of finding a character for which he/she can take advantage of his/her play style in addition to the enjoyment given by an actual game. In order to realize this enjoyment, the relationship between the characteristic parameters and the ability parameters of the character is intentionally made secret and unknown to the player when the player selects the character. When the relationship between the characteristic parameters and the ability parameters that are associated with a selected character matches operational characteristics of the player, a result shows a prominent increase of the characteristic parameters of the character. In a reverse case, a result shows a poor increase of the characteristic parameters of the character. Because such a change in characteristic parameters of the character is expressed as a change in the way the character is displayed, a game result which reflects a habit of the player becomes obvious to the player. Therefore, this stimulates a player's motivation to enter a game and encourages the player to actively enter the game in search of a character suitable for his/her own habit.

Figure 1:
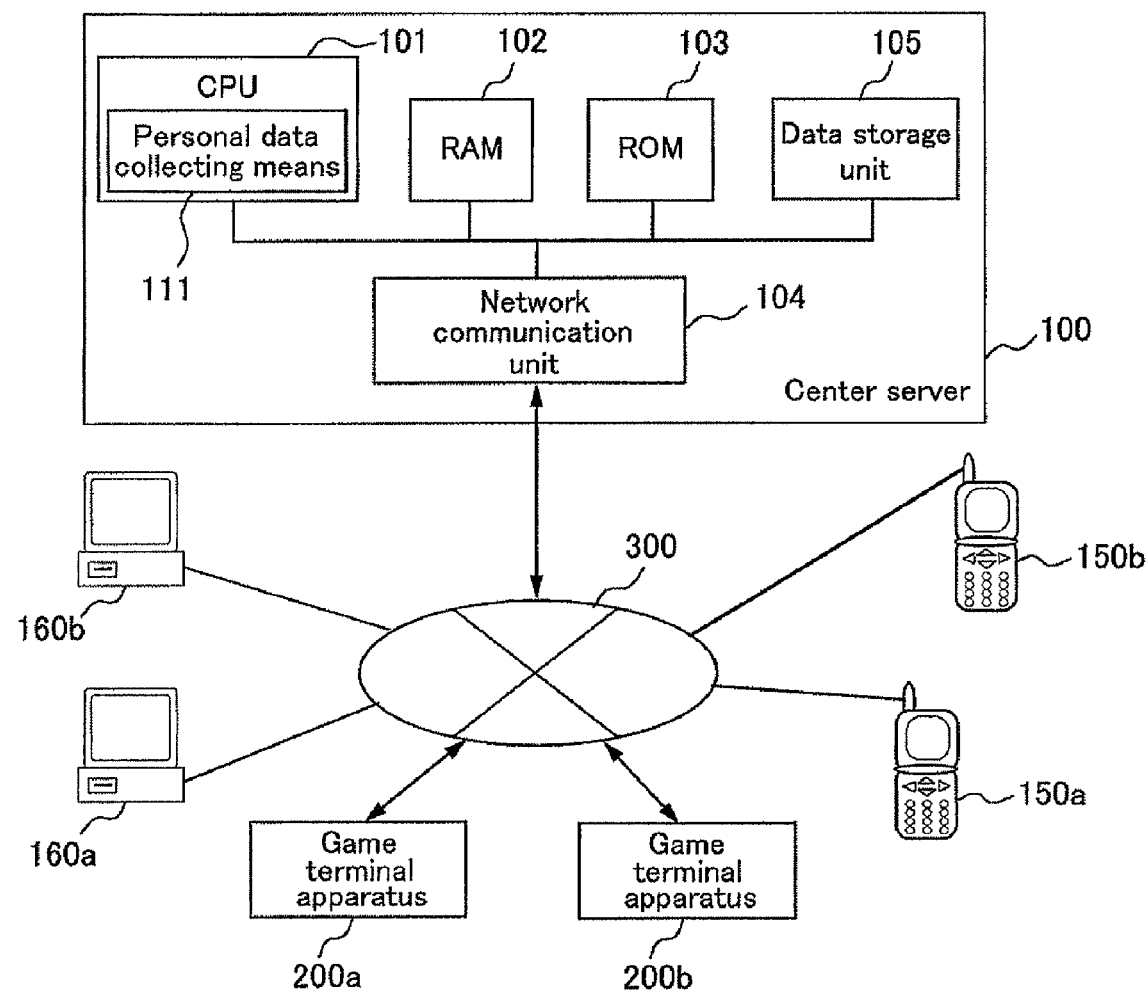
FIG. 1 is an explanatory diagram showing an overall configuration of a game system according to a first embodiment.

First Embodiment (1) Configuration of Game System According to the Present Embodiment FIG. 1 is an explanatory diagram showing an overall configuration of a game system according to a first embodiment of the present invention. This game system comprises a center server 100 and a plurality of game terminal apparatuses 200a, 200b . . . . The game system may further include mobile phone terminals 150a, 150b . . . and personal computers 160a, 160b . . . . The game terminal apparatus 200, the mobile phone terminal 150 and the personal computer 160 are connected to the center server 100 via a network 200.

(1-1) Center Server

The center server 100 receives personal data of a player from the game terminal apparatus 200 and stores it. In response to the request from the game terminal apparatus 200, the center server 100 also transmits the personal data to the request source. The center server 100 comprises the following elements (a) to (e).

(a) CPU 101: A CPU 101 achieves a plurality of functions explained later based on a control program and the like stored in a ROM 103 or a RAM 102.

(b) RAM 102: A RAM 102 temporarily stores a control program, personal data, etc.

(c) ROM 103: A ROM 103 stores a control program, etc.

(d) Network communication unit 104: A network communication unit 104 exchanges data among the game terminal apparatus 200, the mobile phone terminal 150 and the personal computer 160 via the network 300.

(e) Data storage unit 105: A data storage unit 105 stores personal data of each player transmitted from the game terminal apparatus 200. Examples of the personal data may be a player ID, authentication information containing a password and the like. The details of the personal data will be explained later.

(1-2) Game Terminal Apparatus

Figure 2:
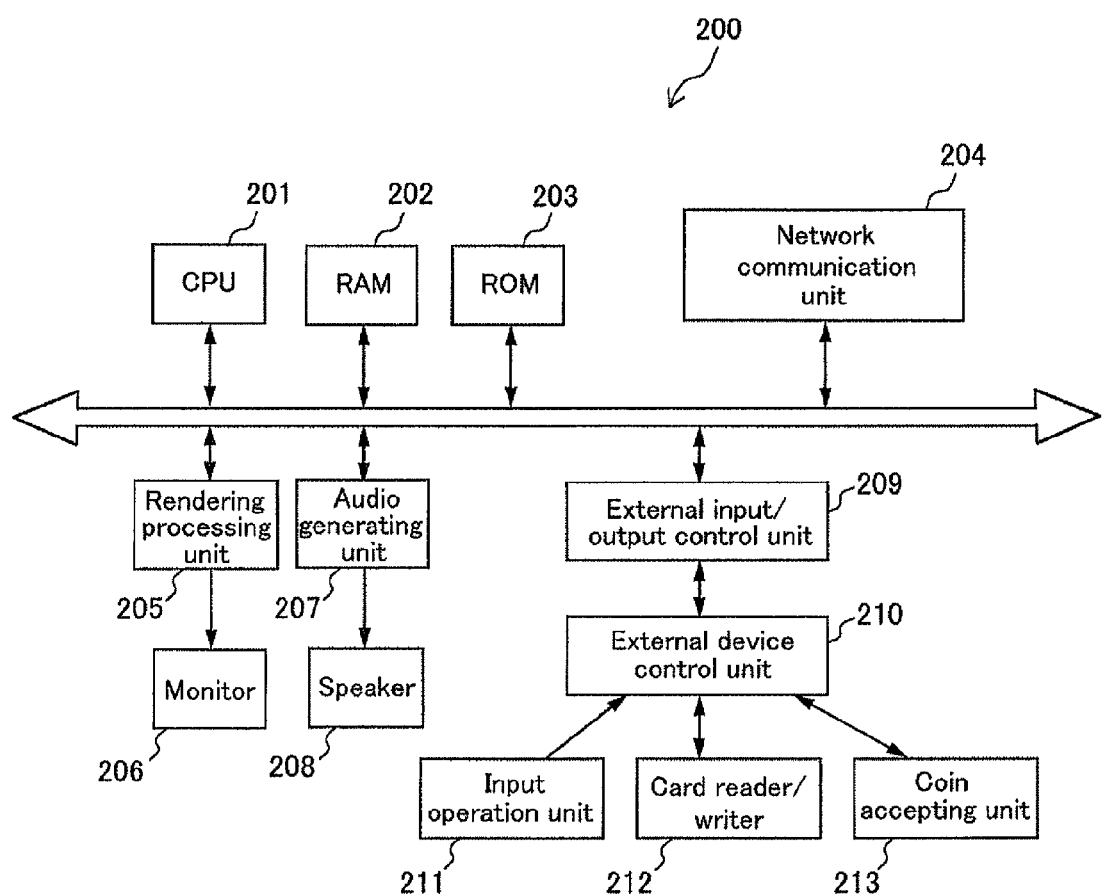
FIG. 2 is a configurational diagram of a game terminal apparatus.

FIG. 2 shows one example of a configuration of the game terminal apparatus 200. The game terminal apparatus 200 may be a dedicated case for a game in which a CPU is loaded, the mobile phone terminal 150, the computer terminal 160 connected to a monitor, a notebook PC or the like. The game terminal apparatus 200 has the following elements (a) to (m).

(a) CPU 201: A CPU 201 achieves a plurality of functions explained later based on a control program stored in a ROM 203 explained later, data for a game stored in a RAM 202 explained later, etc.

(b) RAM 202: A RAM 202 temporarily stores various kinds of data for a game such as various variables and parameters.

(c) ROM 203: A ROM 203 stores a control program, various parameters including a characteristic parameter, etc.

(d) Network communication unit 204: A network communication unit 204 exchanges data with the center server 100 via the network 300.

(e) Monitor 206: A monitor 206 displays a game screen during a game, a result of each ability parameter of a game, a character before and after a game, etc.

(f) Rendering processing unit 205: A rendering processing unit 205 generates image data to be displayed on the monitor 206.

(g) Speaker 208: A speaker 208 outputs sounds such as a sound effect when a game is being executed, when a demo screen is being displayed, and when a game result is displayed.

(h) Audio generating unit 207: An audio generating unit 207 generates sound data to be outputted by the speaker 208.

(i) Input Operation Unit 211: An Input Operation Unit 211 accepts an instruction input by a player. In the present embodiment, a guitar controller in a guitar shape is taken as an example, but a controller may be in any other shape such as a drum and a wind instrument. The Input Operation Unit 211 may also include a keyboard, joy stick, operating button, lever, pedal, etc.

(j) Card reader/writer 212: A card reader/writer 212 reads a card ID from a magnetic card to be inserted. It may also perform a write-in process to write a player ID and a game result as needed.

(k) Coin accepting unit 213: A coin accepting unit 213 accepts a credit by an inserted coin.

(l) External device control unit 210: An external device control unit 210 controls an external device such as the input operation unit, card reader/writer 212 and coin accepting unit 213.

(m) External input/output control unit 209: An external input/output control unit 209 generates a control signal to an external device such as the input operation unit, card reader/writer 212 and coin accepting unit 213. It also receives a detection signal from the external device and transmits it to the CPU 201.

Figure 3:
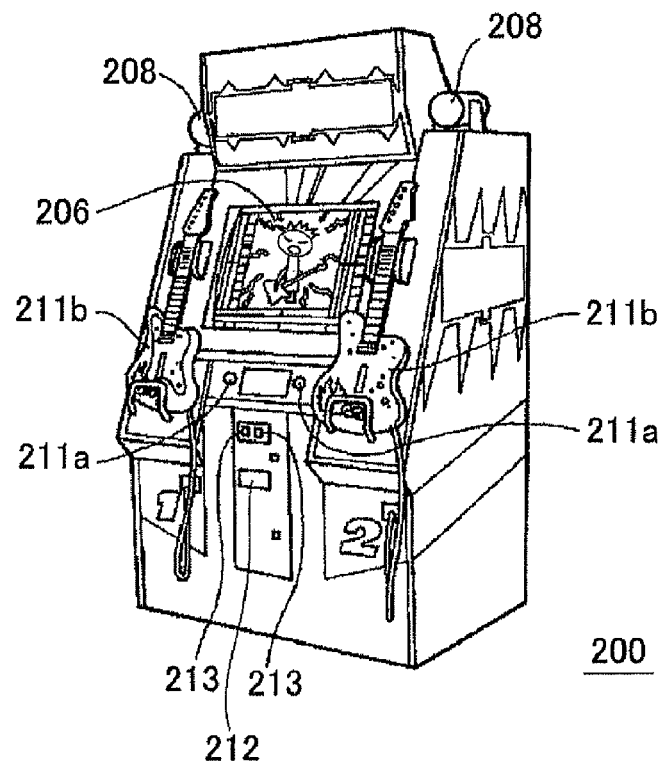
FIG. 3 is an external perspective view of a music game apparatus which is one specific example of the game terminal apparatus.

(2) Example of Game Terminal Apparatus (2-1) Configuration of Game Terminal Apparatus FIG. 3 is an external perspective view of a music game apparatus which is one specific example of the game terminal apparatus 200. For example, a music game is executed in this game terminal apparatus 200. The music game apparatus is provided with the monitor 206 on the front of the case. Also, the Input Operation Unit 211a such as a start button is provided on the left and the right below the monitor 206, and the two coin accepting units 213 is provided on the left and the right below that. Further, provided below the coin accepting units 213 is the card reader/writer 212. Also, an imitation instrument as the input operation unit 211 with which a player inputs rhythmic sounds, i.e. a guitar controller 211b, is placed on both the left and the right of the monitor 206. Further, the speakers 208 to produce the effects of a play tune are arranged above the monitor 206. By arranging two guitar controllers 211b, two players can play a music game by each of them operating input of each guitar controller 211b.

Figure 4:
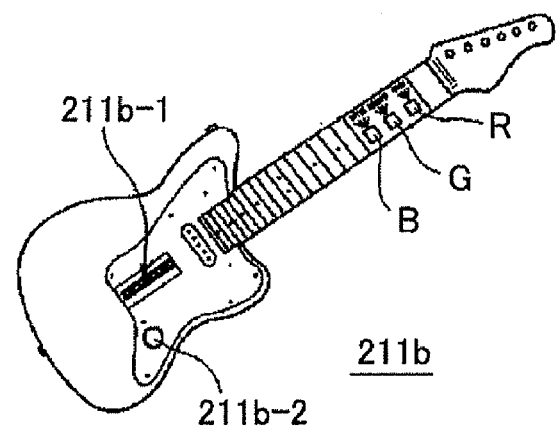
FIG. 4 is an enlarged view of a guitar controller.

FIG. 4 is an enlarged view of the guitar controller. The guitar controller 211b has three kinds of neck button R, C, and B for selecting the kind of a rhythmic sound. The guitar controller 211b also has a picking input means 211b-1 for deciding the timing to output a rhythmic sound selected by at least one neck buttons. The guitar controller 211b further has a switching switch 211b-2, which is arranged below the picking input means 211b-1 for switching an output mode of the rhythmic sound.

(2-2) Execution of Game

The game terminal apparatus 200 thus configured performs a game as follows in accordance with a control program stored in the ROM 203. A player inserts a magnetic card that the player owns into the card reader/writer 212 and drops a coin into the coin accepting unit 213 on the game terminal apparatus 200. The game terminal apparatus 200 reads out the card ID for identifying the card from the magnetic card inserted into the card reader/writer 212 and requests the player to input his/her password. The inputted password is compared with data in the center server 110, and personal authentication is performed. When the game terminal apparatus 200 accepts an instruction to start a game from the authenticated player, the game is initiated by the CPU 201 executing the control program. A result of a predetermined ability parameter is computed based on the execution of the game.

(2-3) Outline of Game

Figure 5:
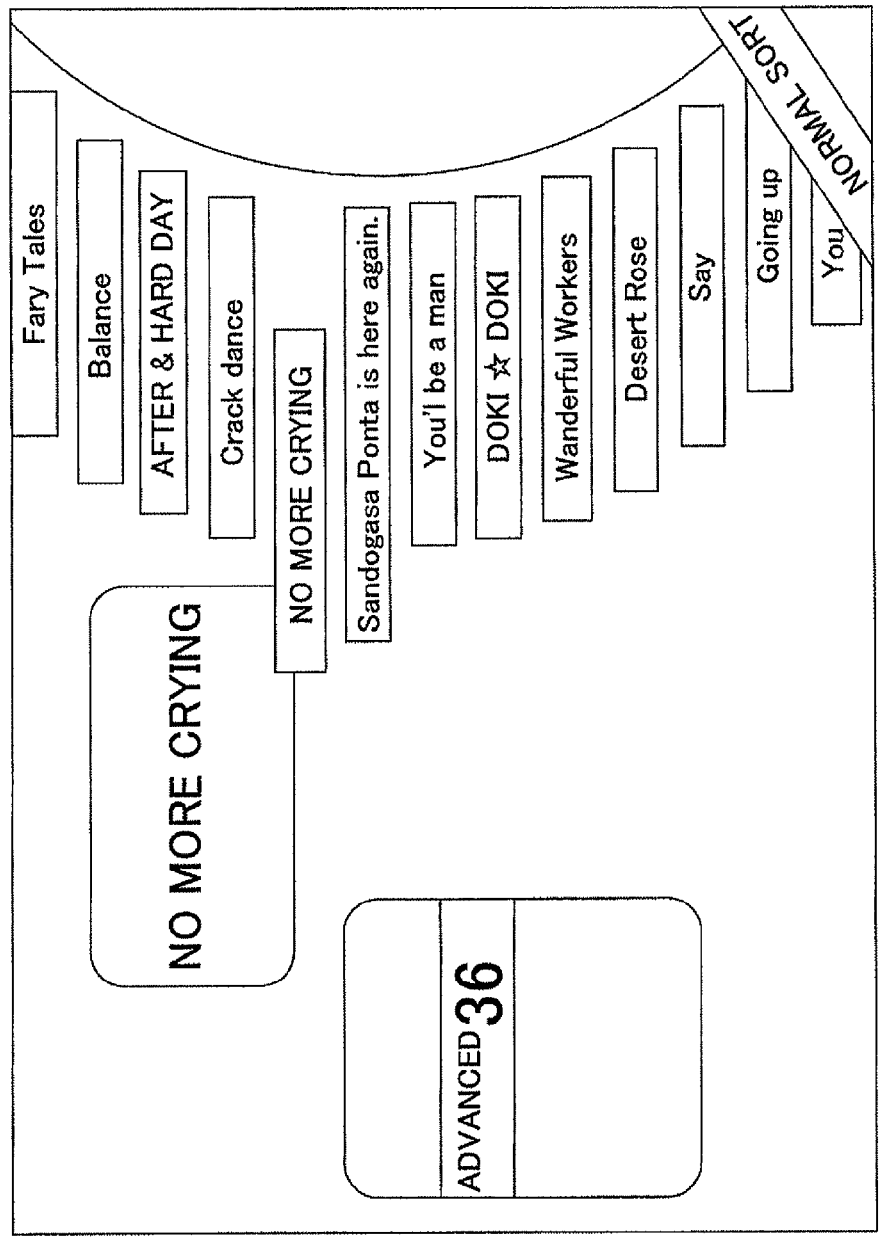
FIG. 5 is an explanatory diagram showing one example of a tune selection screen.

Next, with reference to FIGS. 5 to 7, the outline of the music game performed on the game terminal apparatus 200 will be explained. FIG. 5 shows one example of a tune selection screen displayed on the monitor 206. The tune selection screen accepts a difficulty level value and a tune selected by the player. In FIG. 5, a difficulty level value "ADVANCED 36" and a tune "NO MORE CRYING" are selected.

Figure 6:
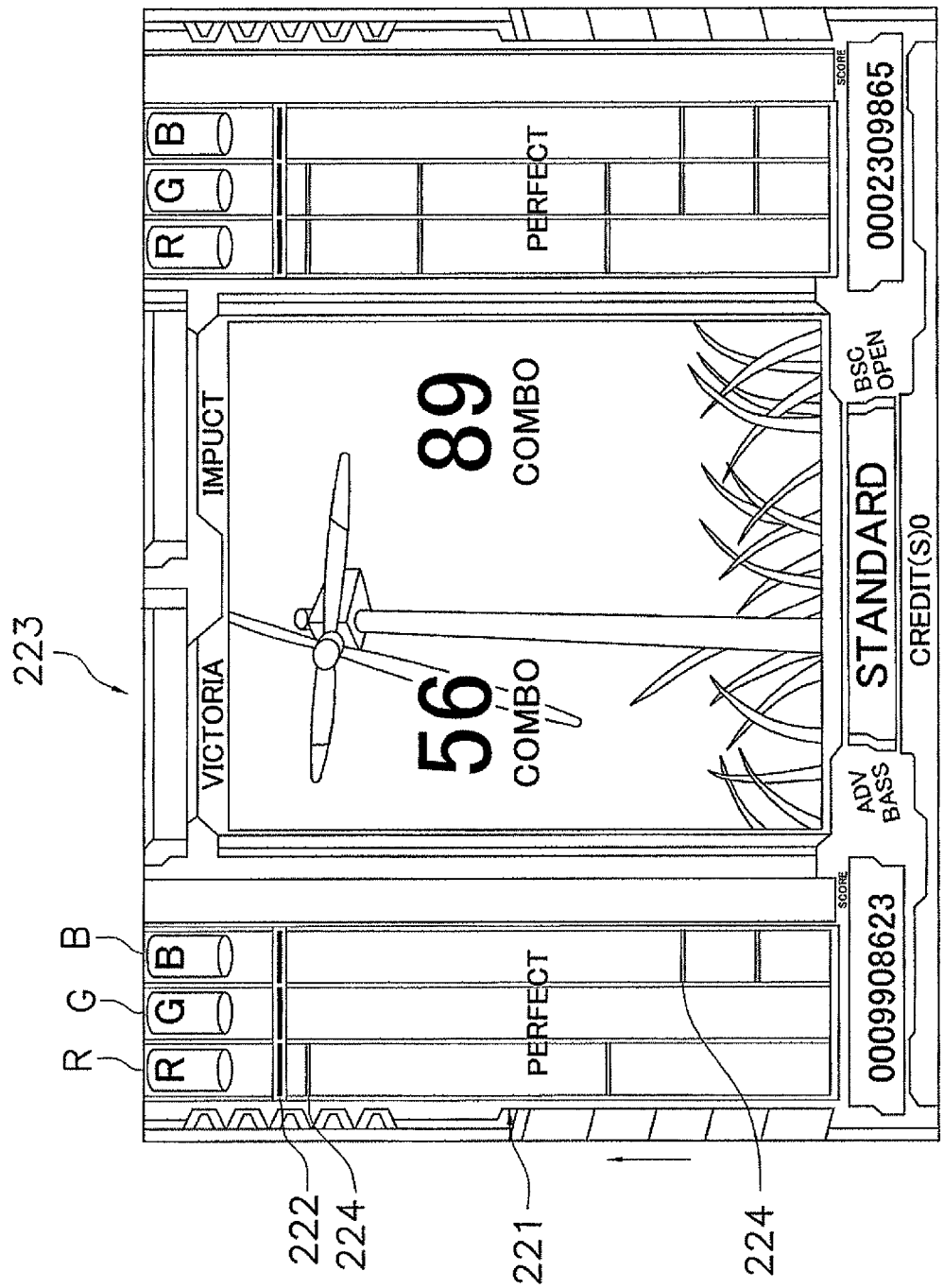
FIG. 6 is an explanatory diagram showing one example of a game screen.

FIG. 6 shows one example of a game screen 223 displayed on the monitor 206. In this game, a note 224 that indicates an operation timing of each rhythmic sound corresponding to each play tune (BGM) is displayed on a note displaying unit 221 for each rhythmic sound as shown in FIG. 6. A note 224 for each rhythmic sound independently moves towards a reference line 222 (e.g. an upward direction in FIG. 6) of the note displaying unit 221 as a tune progresses. It is the operation timing for the player to operate the picking input means 211b-1 when the note 224 and the reference line 222 meet. The player operates the neck buttons R, G and B to the rhythmic sounds with one hand and inputs an operation signal by operating the picking input means 211b-1 and the switching switch 211b-2 with the other hand while checking the position of the note 224.

The CPU 201 monitors a gap between the operation timing and the input timing of the operation signal, displays "Perfect", "Great", "Good", "Poor" and "Miss" on the note displaying unit 221 based on how big the gap is, and counts the occurrence frequency thereof. The CPU 201 computes a result of a part or all of predetermined game parameters based on the occurrence frequency, further computes the results of the ability parameters based on the game parameters, and determines a game result of the player. In the present example, there are seven game parameters as follows. Note that the kind and the number of game parameters can be set in any way depending on how a game is designed and are not limited to this example. The way to compute the results of the ability parameters from the results of the game parameters will be explained later (see FIG. 11 explained later).

<<Examples of Game Parameter>>

(a) Skill point: Skill point is computed based on the occurrence frequency of "Perfect", "Great", "Good" and "Poor".
(b) Maximum combo value: Combo value indicates the occurrence interval of "Miss" and a maximum combo value indicates the longest interval among the occurrence intervals of "Miss".
(c) Difficulty level value: Difficulty level value indicates a difficulty level of a tune selected by a player (see FIG. 5).
(d) Remaining life amount: Remaining life amount is computed by reducing a predetermined value in accordance with the occurrence of "Miss".
(e) Rank: Rank indicates a rank to which a player belongs.
(f) Number of "Perfect": The number of "Perfect" indicates the total number of "Perfect" while one tune is being played.
(g) Score: Score is computed based on each value of the parameters (a) to (f) and a predetermined calculating formula.

Figure 7:
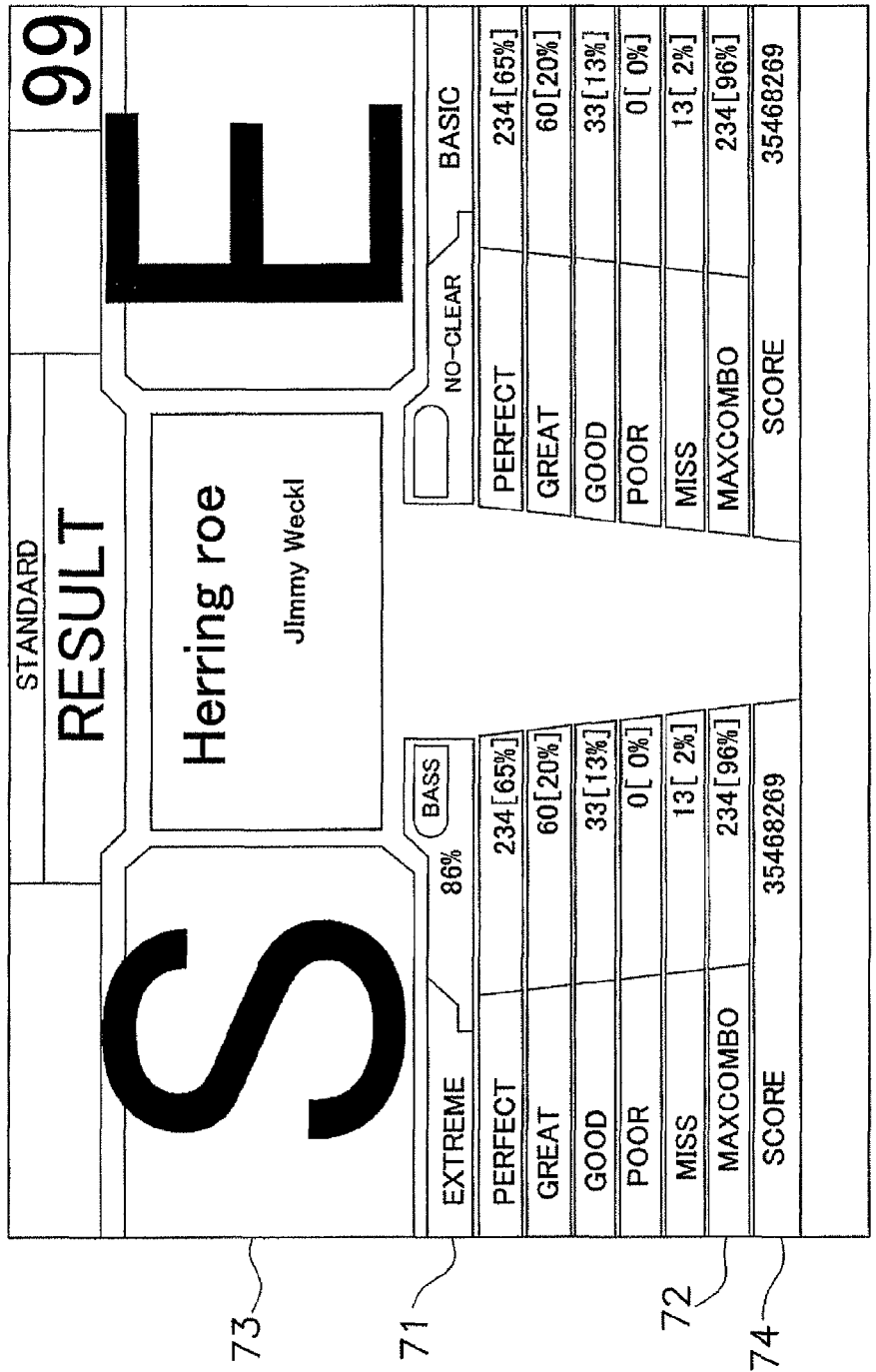
FIG. 7 is an explanatory diagram showing one example of a result screen after a music game is completed.

FIG. 7 shows one example of a result screen after the music game is completed. After the game is completed, the CPU 201 displays Skill point 71 ("EXTREME", "86%" in the figure), Maximum combo value 72 ("MAXCOMBO", "234 [96%]" in the figure), Rank 73 ("S" in the figure), Score 74 ("SCORE", "35468269" in the figure), etc. on the monitor 206. When the remaining life amount is not zero after one tune is completed, the player can proceed to the next stage. Therefore, the player can enjoy a game based on a plurality of tunes by proceeding to a further stage until the remaining life amount becomes zero. When the remaining life amount becomes zero, the game is terminated even in the middle of a tune.

(3) Evaluation of Game Result

Next, the evaluation of game result when the present invention is applied to the music game as a game will be explained.

(3-1) Functional Configuration of Center Server

FIG. 8 is a conceptual explanatory diagram of personal data. The CPU 101 of the center server 100 functions as a personal data collecting means 111 (see FIG. 1) and personal data collected by the personal data collecting means 111 is stored in a data storage unit 105.

In this example, personal data includes "player ID", "player name", "authentication information", "card ID" and "ability parameter accumulated result" in one record. "Player ID" is identification information for identifying a player. "Player name" indicates a name of player. "Authentication information" is a password or a PIN number used for authenticating a player. "Card ID" is identification information for identifying a card that a player owns. Note that a card ID is stored in each card. "Ability parameter accumulated result" indicates an accumulated value of a result of each ability parameter (hereinafter referred to as ability parameter accumulated result) of the games that a player played in the past. The accumulated value of each ability parameter included in the ability parameter accumulated result may be an accumulated value of a result of each ability parameter computed in one kind of game, or may be an accumulated value of a result of each ability parameter that can be evaluated commonly among different kinds or versions of game.

With reference to FIG. 1 again, a function of the personal data collecting means 111 that the CPU 101 has will be explained. The personal data collecting means 111 receives personal data described above from each game terminal apparatus 200 and updates the data storage unit 105. For example, when receiving a player ID and a game result including a result of each ability parameter from the game terminal apparatus 200, the personal data collecting means 111 updates the ability parameter accumulated result corresponding to that player ID. That means that the personal data collecting means 111 updates a result of each ability parameter by adding the received result for each ability parameter. A game result that the personal data collecting means 111 receives may contain a result of an ability parameter over a plurality of stages.

(3-2) Functional Configuration of Game Terminal Apparatus

Figure 9:
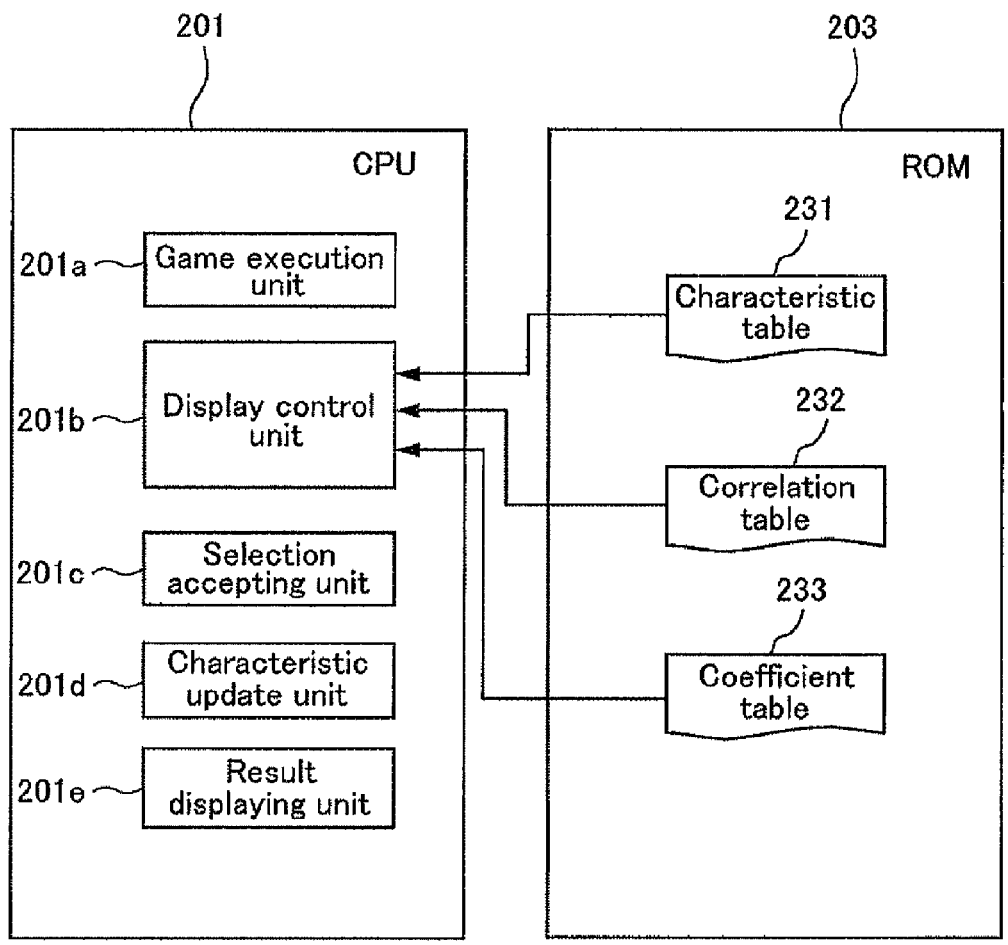
FIG. 9 is an explanatory diagram showing a functional configuration of a CPU of the game terminal apparatus.

FIG. 9 is an explanatory diagram showing a functional configuration of the game terminal apparatus 200. The CPU 201 of the game terminal apparatus 200 has a game execution unit 201$a$, a display control unit 201$b$, a selection accepting unit 201$c$, a characteristic update unit 201$d$ and a result displaying unit 201$e$. The ROM 203 of the game terminal apparatus 200 has a characteristic table 231, a correlation table 232 and a coefficient table 233 stored therein. The CPU 201 of the game terminal apparatus 200 accepts a selection of any one of a plurality of characters (hereinafter referred to as selection character) from a player before starting the execution of a game. Further, the CPU 201 displays the selection character changed in accordance with the game result after the execution of the game.

Each table stored in the ROM 203 will be explained first followed by an explanation of the function of the CPU 201.

(3-2-1) Table Stored in ROM

<<Characteristic Parameter>>

FIG. 10 is a conceptual explanatory diagram of information stored in the characteristic table 231. In the present embodiment, each character is displayed based on the values of six characteristic parameters, i.e. "physical strength", "quickness", "technique", "guts", "luck" and "muscular strength". The characteristic table 231 defines the correlation between the six characteristic parameters and each character. The characteristic table 231 also stores the initial values of a plurality of characteristic parameters for each character Here, the characteristic parameter means a parameter used for displaying each character. In this example, a plurality of characters are identified by character IDs, "chara1", "chara2", "chara3" . . . , respectively. Each characteristic parameter is identified by a characteristic parameter name, "physical strength", "quickness", "technique", "guts", "luck" and "muscular strength". The characteristic parameter name is set so as not to be the same as the ability parameter name.

The characteristic table 231 may store for each character an initial value for one of the characteristic parameters that is relatively greater than that of the other characteristic parameters. Here, a characteristic parameter having a relatively greater initial value is set to be different from character to character. For example, an initial value of the characteristic parameter "guts" is relatively greater than that of the other characteristic parameters among the characteristic parameters of the character "chara1". Similarly, a different characteristic parameter is set to have a greater initial value than that of the other characteristic parameters for each character, for example "muscular strength" for the character "chara2" and "quickness" for the character "chara3".

Note that other than the characteristic parameters, data necessary for displaying each character is used as needed.

<<Relationship Between Characteristic Parameter and Ability Parameter>>

The relationship between the characteristic parameters and the ability parameters of each character is defined by the correlation between the characteristic parameters and the ability parameters, and the weighting of the ability parameter for each characteristic parameter. The relationship between the two thus defined is set to be different for each character. In the present embodiment, the former correlation is defined by the correlation table 232 and the latter weighting is defined by the coefficient table 233.

FIG. 11 is a conceptual explanatory diagram showing information stored in the correlation table 232. The correlation table 232 correlates each characteristic parameter and each ability parameter of each character on a one-to-one basis. The correlation table 232 also defines each ability parameter by a relational expression with a game parameter as a variable. The correlation table 232 will be explained more in detail below.

First, the correlation between a characteristic parameter and an ability parameter will be explained. The correlation table 232 correlates on a one-to-one basis each characteristic parameter that is identified by a characteristic parameter name, and each ability parameter that is identified by an ability parameter name. For example, the characteristic parameter "physical strength" is correlated with the ability parameter "life", and the characteristic parameter "quickness" with the ability parameter "difficulty level value". The characteristic parameter names and the ability parameter names are set so as not to be the same as each other. As described later, a hint can be given so that a player can assume the relationship between the characteristic parameters and the ability parameters while concealing their relationship by making the characteristic parameter names and the ability parameter names different from each other.

The correlation table 232 correlates the characteristic parameter and the ability parameter of each character on a one-to-one basis in the present example, but it may also be a one-to-multiple basis. For example, the characteristic parameter "technique" may be correlated with the ability parameters "skill" and "difficulty level value". Also, one characteristic parameter may be correlated with an ability parameter on a one-to-one basis, and another characteristic parameter may be correlated with multiple ability parameters on a one-to-multiple basis.

Next, the relationship between the ability parameters and the game parameters will be explained. An ability parameter is computed based on a game parameter. The correlation table 232 defines for each ability parameter a relational expression for computing each ability parameter. Each relational expression takes one game parameter as a variable. The ability parameters and the game parameters are correlated on a one-to-one basis by the relational expressions. For example, because the ability parameter "life" is defined by a relational expression with the "remaining life amount" as a variable, the ability parameter "life" is correlated with the game parameter "remaining life amount" on a one-to-one basis. Similarly, the characteristic parameter "quickness" is defined by a relational expression with the ability parameter "difficulty level value" as a variable, and is correlated with the ability parameter "difficulty level value" on a one-to-one basis. The other characteristic parameters are associated with ability parameters on a one-to-one basis in a similar manner.

The ability parameters computed with these relational expressions are transmitted as a game result of the player from the game terminal apparatus 200 to the center server 100 after the game is completed. What is indicated as "* * total" in FIG. 11 is an accumulated value of a game parameter from each stage when the game is executed over a plurality of stages.

FIG. 12 is a conceptual explanatory diagram showing information stored in the coefficient table 233. The coefficient table 233 stores for each character a coefficient for defining the weighting of an ability parameter that is correlated with a characteristic parameter. The coefficient table 233 makes the weighting of an ability parameter different from character to character by the coefficient thus defined. The coefficient table of FIG. 12 also defines the relational expressions between the characteristic parameters and the ability parameters.

Taking the character "chara1" as an example, a coefficient "1.5" is set for the characteristic parameter "guts", and a coefficient "1" for the other characteristic parameters. Therefore, it is defined that a value of the characteristic parameter "guts" is 1.5 times greater than a value of the ability parameter "PERFECT" and values of the other characteristic parameters are the same as the values of the corresponding ability parameters. In other words, the weighting of the ability parameter "PERFECT" that is correlated with the characteristic parameter "guts" is set to be greater for the character "chara1".

Similarly, a value of the characteristic parameter "muscular strength" is 1.5 times greater than the ability parameter "combo value" for the character "chara2", and the weighting of the ability parameter "combo" is set to be greater. A weighting of the ability parameter "difficulty level value" is set to be greater for the character "chara3", the ability parameter "skill" for the character "chara4", the ability parameter "life" for the character "chara5", and the ability parameter "rank" for the character "chara6".

In this way, an ability parameter with the highest weighting is set to be different from character to character. Therefore, even when the correlation between the characteristic parameters and the ability parameters is the same for each character, the relationship between the characteristic parameters and the ability parameters will be different for each character. By changing the relationship between each characteristic parameter and each ability parameter for each character, a change of characteristic parameters can be varied depending on a character even when the same game performance is made. As a result, a characteristic of the game performance can be reflected to a character displayed in a selection accepting step and a visual change of a character.

Further, in this embodiment, a characteristic parameter to which the greatest coefficient is set in the coefficient table 233 matches a characteristic parameter to which the greatest initial value is set in the characteristic table in FIG. 10 with respect to one character. For example, a characteristic parameter whose corresponding ability parameter is given the highest weighting is the characteristic parameter "guts" among the characteristic parameters of the character "chara1". On the other hand, a characteristic parameter whose initial value is the greatest is the characteristic parameter "guts" among the characteristic parameters of the character "chara1". In this way, a characteristic parameter with the greatest initial value and a characteristic parameter whose corresponding ability parameter is given the highest weighting match. Alternatively, a characteristic parameter with the greatest initial value and a characteristic parameter whose corresponding ability parameter is given the highest weighting may be different.

Note that the relationship between the ability parameters and the characteristic parameters can be changed for each character by changing the correlation between the two for each character, which is different from the present embodiment.

(3-2-2) Function of CPU
<<Game Execution Unit>>

The game execution unit 201a (corresponding to a game execution means) computes a plurality of game parameters of a player based on the execution of a game, and further computes a plurality of ability parameters based on the game parameters. When a game is executed over a plurality of stages, the game execution unit 201a computes the ability parameters based on an accumulated value of the game parameters in each stage after the plurality of stages are completed.

Also, the game execution unit 201a outputs the names of the plurality of ability parameters during or after the execution of the game. For example, the game execution unit 201a displays "difficulty level value" in the tune selection screen shown in FIG. 5. Also for example, the game execution unit 201a displays "COMBO" and "PERFECT" in the game screen 223 shown in FIG. 6.

<<Display Control Unit>>
(i) Displaying Character

The display control unit 201b (corresponding to a character display means and a relationship concealing means) displays a plurality of characters based on the initial values of the characteristic parameters stored in the characteristic table 231 prior to starting the execution of a game by the game execution unit. More specifically, the display control unit 201b generates a selection screen for displaying each character based on the initial values thereof. The details of the selection screen will be explained later.

As described with respect to the characteristic table 231, an initial value is given to one of the characteristic parameters of each character that is greater than that of the other characteristic parameters. A characteristic parameter to which a relatively greater initial value is given is different from character to character. Therefore, the display manner of a character displayed based on the initial values of the characteristic parameters includes the display manner that reflects the initial values. In this way, the relationship between the characteristic parameters and the ability parameters of each character is indirectly shown to a player and the enjoyment to examine and choose a character will be given to the player.

(ii) Concealing Relationship

The display control unit 201b conceals the relationship between the characteristic parameters and the ability parameters of each character at the stage of displaying each character on the selection screen. More specifically, the display control unit 201b prevents a direct output of the correlation and the weighting of each characteristic parameter and each ability parameter stored for each character.

Here, the direct output of the correlation and the weighting means to output a relational expression that defines an ability parameter corresponding to a characteristic parameter, and a text that indicates an ability parameter having the highest weighting. In other words, the display control unit 201b conceals the correlation between the characteristic parameters and the ability parameters and the weighting of the ability parameter by basically displaying only a character. A player will discover that the way a character changes differs from character to character and feel enjoyment when the player succeeded in choosing a character that is suitable for him/her. Thus, the player will enjoy the gameability in selecting a character and feel enjoyment pursuing the relationship between a character and its ability parameters.

Figure 13:
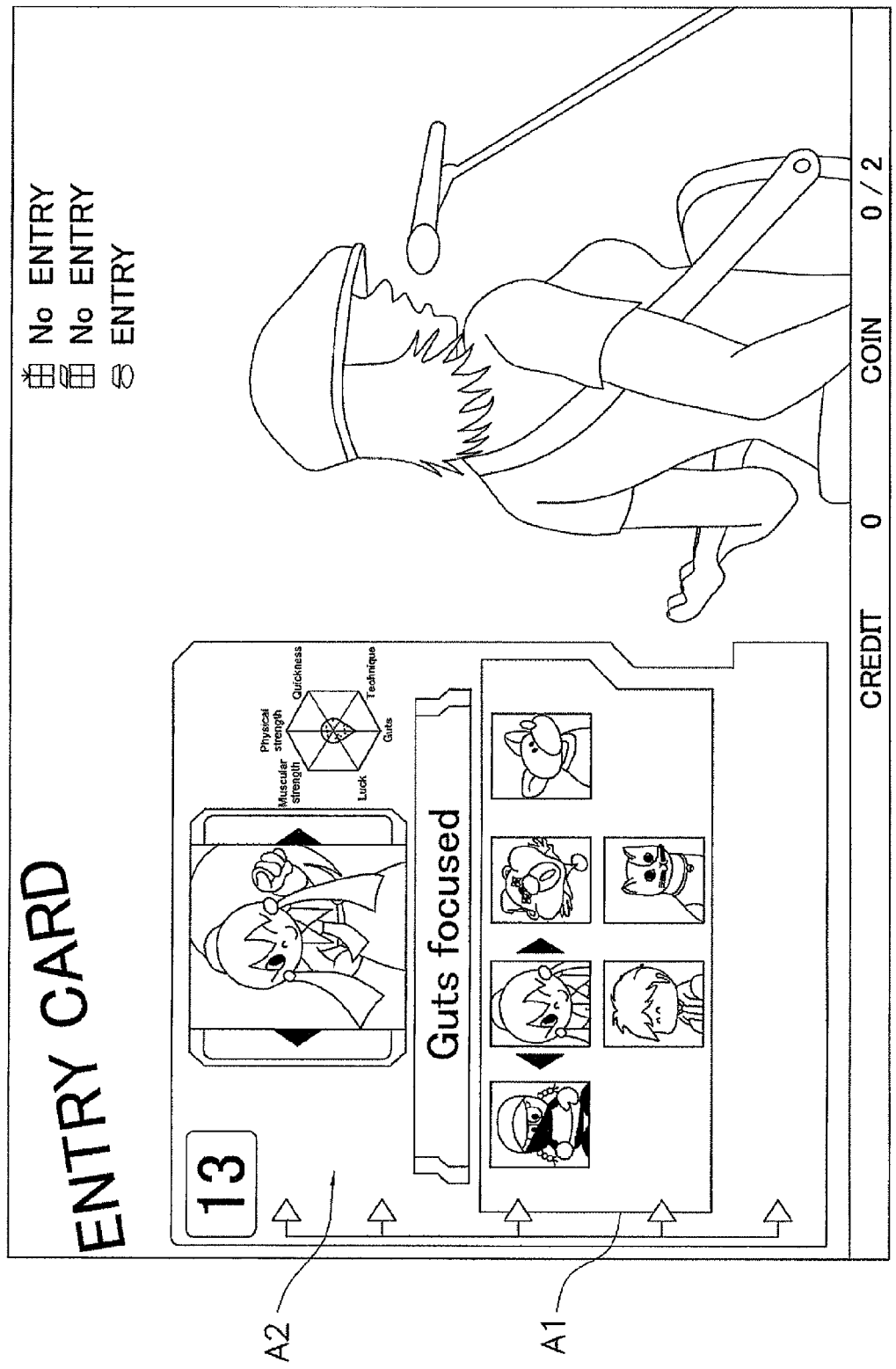
FIG. 13 shows one example of a selection screen (status 1) generated by a display control unit.
Figure 14:
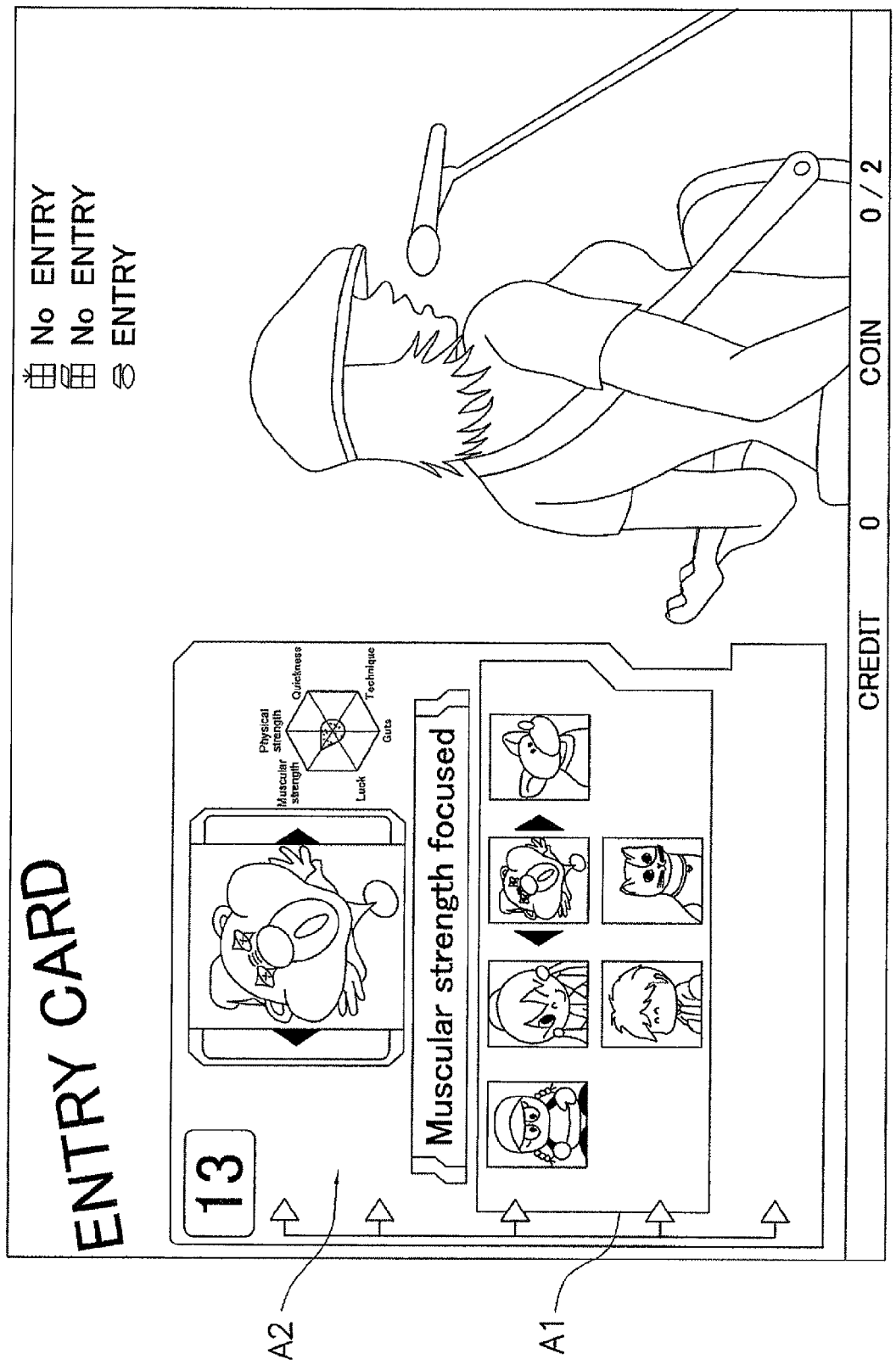
FIG. 14 shows one example of a selection screen (status 2) generated by the display control unit.

A display control unit 201b may display a part or all of a plurality of characteristic parameters on the selection screen with each character correlated therewith. The display control unit 201b may also display a name or a value of a characteristic parameter having a relatively greater initial value among the characteristic parameters of each character with the character correlated therewith. Furthermore, the display control unit 201b may display text data on the selection screen. With reference to FIGS. 13 and 14, these display manners will be explained in detail.

(iii) Selection Screen

FIGS. 13 and 14 each shows an example of a selection screen that the display control unit 201b generates. Selectable characters are displayed in a choice area A1 based on their initial values. When a cursor is positioned on any one of the characters, that character is enlarged and displayed in an enlargement area A2. FIG. 13 and FIG. 14 each shows that a cursor is positioned on a different character. A radar chart of the characteristic parameters of that character or text data may also be displayed as well as the enlarged character.

The radar chart indicates the balance of the initial values of characteristic parameters, i.e. the relative balance of the initial values thereof. A part or all of the names of the characteristic parameters may be displayed with the character correlated therewith in the radar chart. Because the ability parameter names and the characteristic parameter names are set to be different (see the correlation table 232 of FIG. 11), the relationship between the two can be concealed by explicitly displaying the characteristic parameter names. Nevertheless, a hint to assume the relationship between the characteristic parameters and the ability parameters can be given to a player with the characteristic parameter names as a clue. Although not shown, an initial value of each characteristic parameter may be displayed with the radar chart correlated therewith.

Text data is displayed in the enlargement area A2. This text data shows a characteristic parameter name having a relatively greater initial value among the characteristic parameters of each character separately from the other characteristic parameter names. Text data indicating a characteristic parameter name that is different for each character is displayed such as "guts focused" as shown in FIG. 13 and "muscular strength focused" as shown in FIG. 14. As described earlier, although the relationship between the characteristic parameters and the ability parameters is unclear from their names because the characteristic parameter names and the ability parameter names are set to be different, the relationship between the characteristic parameters and the ability parameters of each character can be implied to the player, and the enjoyment to examine and choose a character can be given to the player. Although not shown, an initial value of the characteristic parameter that is greater than that of the other characteristic parameters may be displayed with the radar chart correlated therewith.

It is preferable that text data in the enlargement area A2 indicates that the relationship between each characteristic parameter and each ability parameter is different for each character, as well as concealing the relationship between the two per se. Then, it is expected that this will stimulate a player's motivation to figure out the relationship and encourage the player to enter the game. In these figures, examples are shown where different text is displayed for each character. More specifically, different text data is displayed for each character such as "guts focused" for one character, "muscular strength focused" for another character, and "quickness focused" for yet another character. Also in this example, text data to be displayed indicates a characteristic parameter name having a relatively greater initial value. Although not shown, it may be possible to output a message which can be commonly used for all the characters such as "Characteristics of the characters are secret. Find out which character suits you!" as another example of the text data.

Note that audio data may be outputted instead of or in addition to the text data. In addition to a radar chart, a pie graph, a bar graph, a line graph, variation of these and other display modes are possible as the way to display a relative balance of the initial values of characteristic parameters of a character.

<<Selection Accepting Unit>>

The selection accepting unit 201c accepts from a player the selection of any one of the characters displayed on the selection screen in FIGS. 13 and 14, and temporarily stores the selected character, i.e. an ID of the selection character, in the RAM 202 and the like. It is because the characteristic parameters of the selection character are updated based on the results of the ability parameters of the player after the game is executed.

<<Characteristic Update Unit>>

The characteristic update unit 201d updates a value of each characteristic parameter of the selected character. A value of the characteristic parameter is updated based on the ability parameters of the player computed by the game execution unit 201a and the relationship between the characteristic parameters and the ability parameters of the selection character. More specifically, a value of the characteristic parameters are computed based on the relational expression stored in the correlation table 232, and the coefficient and the relationship stored in the coefficient table 232.

<<Result Displaying Unit>>

The result displaying unit 201e displays the selection character based on the value of each characteristic parameters updated by the characteristic update unit 201d. The selection character to be displayed is the selection character that has visually changed from the selection character displayed in the selection screen. This change is a visual display of the game execution result.

Figure 15:
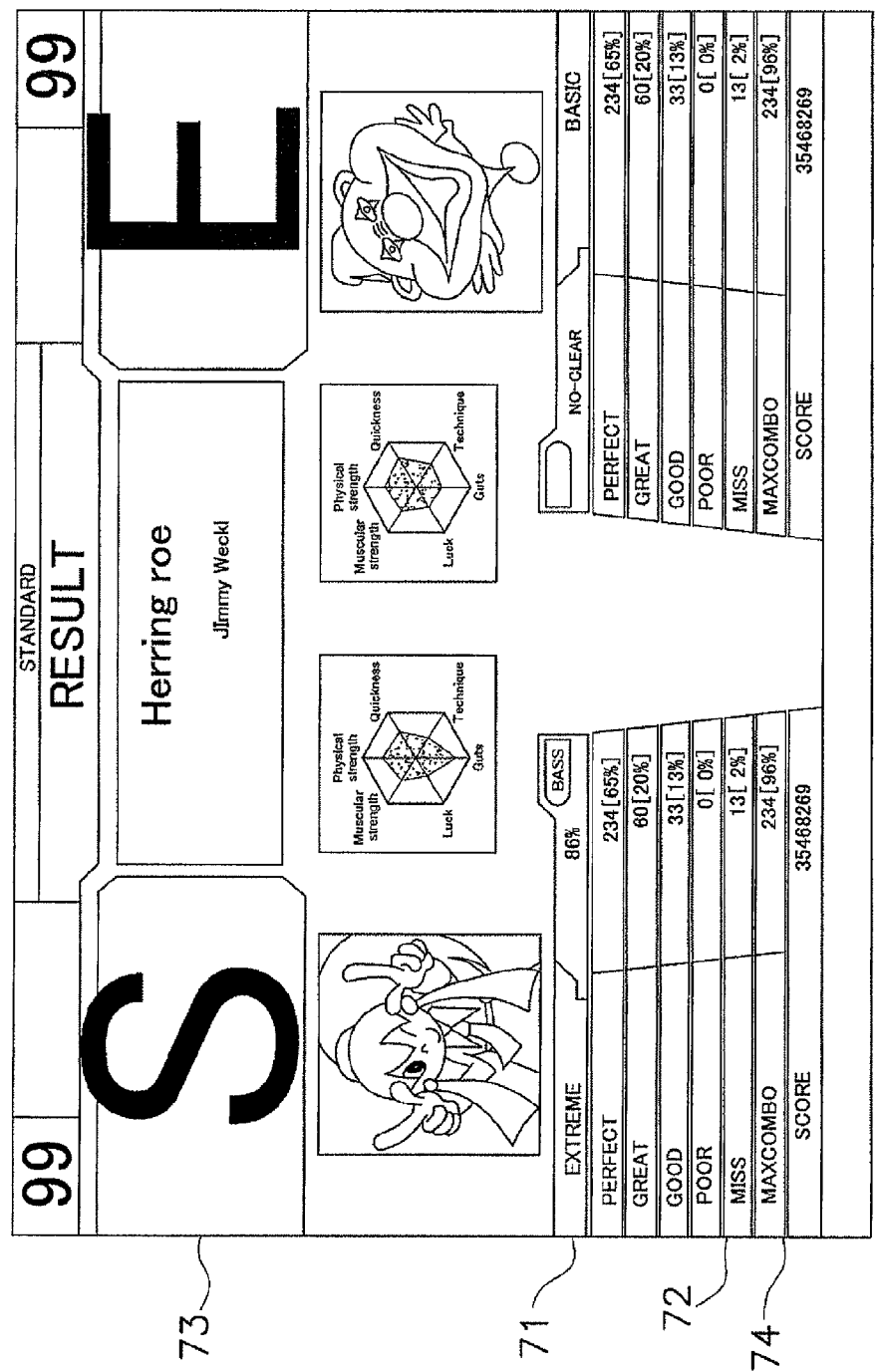
FIG. 15 shows one example of a result screen showing a game execution result and a change of a selection character.

FIG. 15 shows one example of a result screen that indicates the game execution result and the change of the selection character. This result screen is a screen in which the selection character is further displayed in the result screen of FIG. 7. This example shows that a player 1 and a player 2 have selected a different character and each selection character is displayed based on its game execution result. Visual changes are added to each selection character when compared with each selection character in FIGS. 13 and 14. These visual changes are generated by the update of the characteristic parameters. In addition to an image of the selection character, the radar chart of characteristic parameter may also be displayed. The player can know how the balance of the value of each characteristic parameter has changed as a result of executing the game. The player can know the effect his/her performance had on the change of the selection character from the way the image of the selection character and/or the radar chart has changed. When the change is big, it can be said that the game performance of the player matched the characteristic of the selection character. When the change is small, it can be said that the game performance of the player did not match the characteristic of the selection character.

(3-3) Process Flow

Figure 16:
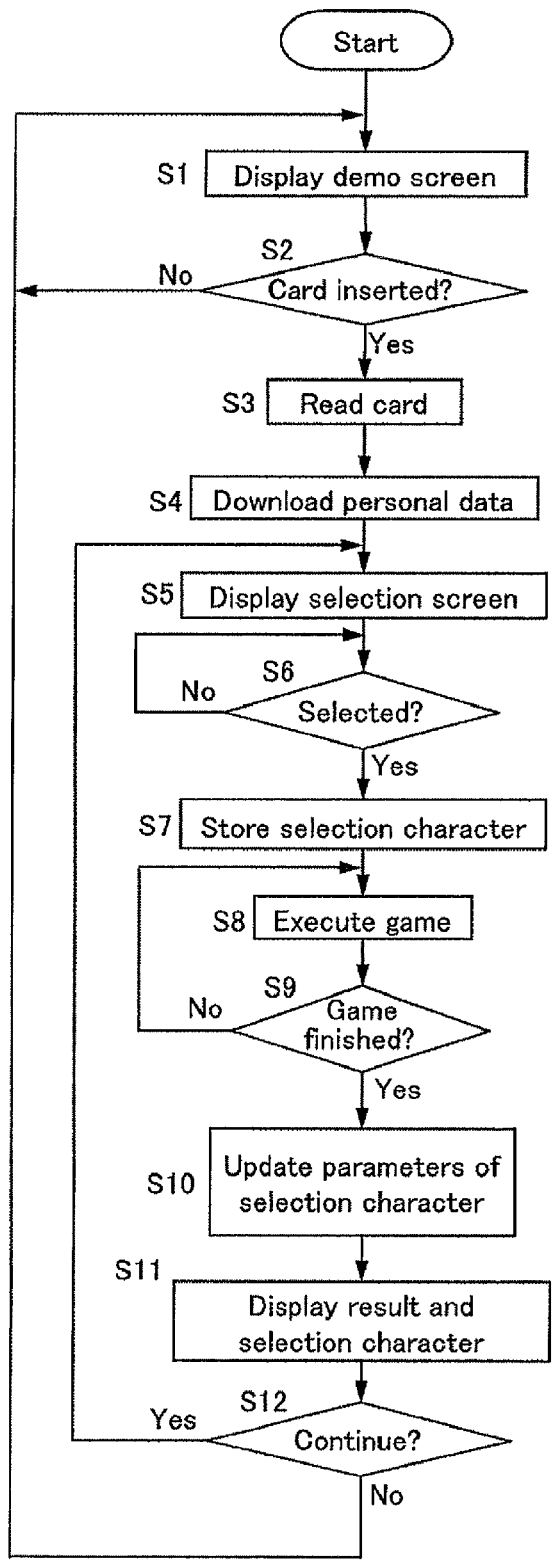
FIG. 16 is a flow chart showing one example of a main processing flow carried out by the game terminal apparatus.

FIG. 16 is a flow chart showing one example of a main processing flow carried out by the game terminal apparatus 200. When the game terminal apparatus 200 is switched on, the following processes start.

Step S1-S2: The CPU 201 waits for an instruction to execute a game while displaying a demonstration screen (S1). For example, when a coin is inputted and a magnetic card is inserted into the card reader/writer 212 (S2), a process proceeds to step S3.

Step S3: The CPU 201 acquires a player ID read out by the card reader/writer 212.

Step S4: The CPU 201 transmits the read out player ID to the center server 100 and downloads personal data corresponding to the player ID. Authentication information is included in the personal data to be downloaded. Subsequently, the CPU 201 requests the player to input the authentication information such as his/her password. The CPU 201 then confirms whether or not the player is the person correlated with the card ID by comparing the inputted authentication information with the authentication information included in the personal data.

Step S5-S6: The CPU 201 displays the selection screen and accepts the selection of any one of the characters. For example, an image of the character, a radar chart indicating the balance of a value of the character's characteristic parameters, and text data indicating the characteristic of the character are correlated and displayed in the selection screen.

Step S7: The CPU 201 stores an character ID of the selection character in the RAM 202 and the like.

Step S8-S9: The CPU 201 executes the game until the game ends and computes the player's ability parameters.

Step S10: The CPU 201 computes the characteristic parameters of the selection character based on the ability parameters computed based on the execution of the game.

Step S11: The CPU 201 displays a result screen including the selection character based on the value of the characteristic parameters computed in Step S10. The value of the ability parameters computed based on the execution of the game may be displayed in the result screen.

Step S12: The CPU 201 makes an inquiry to the player whether or not he/she wishes to continue the game, and if the game is to be continued, the process returns to Step S5 and accepts the selection of character again. When the game is not to be continued, the process returns to Step S1 and displays the demonstration screen.

(5) Effect

In the present embodiment, a player can select a selection character and know the validity of the selection result as an execution result of a game. Because a game result changes depending on each character, the player will try to find the character with which the player can make use of his/her own play style. However, because the relationship between the characteristic parameters of the character and the ability parameters is unknown to the player when the player selects the character, the player can enjoy the additional gameability even at the time of selecting the character. Because the change of the characteristic parameters of the character is expressed as the change of the way the character is displayed, a game result which reflects a habit of the player becomes obvious to the player. Therefore, this stimulates a player's motivation to enter the game and encourages the player to actively enter the game in search of a character that is suitable for his/her own habit.

Other Embodiments (A) In the first embodiment, a music game was taken as an example of a game, but a game is not limited thereto. A game which evaluates a player for at least one parameter can be used as a game. Examples of other games may be a virtual pet game, a soccer game, and a simulation game.

(B) In the first embodiment, the values of the characteristic parameters are determined based on the relational expressions of the ability parameters and the game parameters obtained by the execution of a game, and a definition of the correlation between the characteristic parameters and the ability parameters computed based on the relational expressions. However, when a plurality of game parameters obtained by the execution of the game are normalized, the values of the characteristic parameters can be obtained by correlating the game parameters and the characteristic parameters. In this case, the game parameters can be used as the ability parameters.

(C) The present invention includes a computer program for causing a computer to execute the above method, and a computer readable recording medium on which such program is recorded. Here, the program may be the one that is downloadable. Examples of the recording medium include a computer readable flexible disk, hard disk, semiconductor memory, CD-ROM, DVD, magneto optical disk (MO) and the like.

INDUSTRIAL APPLICABILITY

The game result evaluation method according to the present invention is applicable to any games that evaluate a game result based on a predetermined evaluation item.

What is claimed is:

1. A game result evaluation method performed by a game device, the game result evaluation method comprising:
    computing a plurality of ability parameters of a player based on an execution of a game played on the game device;
    storing on the game device a plurality of characteristic parameters that are correlated with a plurality of characters respectively and used for displaying each character, and initial values thereof;
    storing on the game device for the each character a relationship between each of the plurality of characteristic parameters of the each character and the plurality of ability parameters computed in the step of game execution;
    displaying on the game device the plurality of characters based on the initial values of the characteristic parameters prior to the step of the game execution;
    concealing from the player the relationship between the plurality of characteristic parameters and the plurality of ability parameters of each character when displaying the characters;
    accepting a selection of any of the plurality of characters displayed when displaying the characters;
    updating a value of each of the characteristic parameters of the selected character based on the ability parameters of the player computed during the game execution and the relationship between the characteristic parameters of the selected character that is the selected character when accepting the selection and the ability parameters; and
    displaying on the game device the selected character that has visually changed from the selected character displayed when displaying the characters as an execution result of the game based on the value of each of the characteristic parameters updated when updating the characteristic parameters.

2. The game result evaluation method according to claim 1, wherein the storing of the characteristic parameters includes storing for the each character a correlation between each of the characteristic parameters and each of the ability parameters, and a weighting of each of the ability parameters for each of the characteristic parameters, the updating of the characteristic parameters includes updating the value of each of the characteristic parameters based on the correlation and the weighting of the storing of the characteristic parameters, and
the concealing of the relationship from the player includes prevention of a direct output of the correlation between each of the characteristic parameters and each of the ability parameters and the weighting per se stored for the each character in the displaying of the characters and accepting the selection.

3. The game result evaluation method according to claim 1 or 2,
wherein the computing of the game execution includes outputting names of the plurality of ability parameters during or after the execution of the game,
the storing of the relationship includes storing of names of the plurality of characteristic parameters that are different from the names of the plurality of ability parameters, and
the concealing of the relationship from the player includes displaying a part or all of the names of the plurality of characteristic parameters with the characters displayed when displaying the characters correlated therewith.

4. The game result evaluation method according to claim 3,
wherein the storing of the characteristic parameters includes storing for each character an initial value for any one of the characteristic parameters that is relatively greater than that of the other characteristic parameters and a characteristic parameter having a relatively greater value is set to be different for each character, and
the displaying of the characters includes displaying the plurality of characters based on the initial values of characteristic parameters of each character.

5. The game result evaluation method according to claim 3,
wherein the storing of the characteristic parameters includes storing for each character an initial value for any one of the characteristic parameters that is relatively greater than that of the other characteristic parameters and a characteristic parameter having a relatively greater value is set to be different for each character, and
the concealing of the relationship includes displaying a value of characteristic parameter having a relatively greater initial value among the characteristic parameters of each character with its name and a character correlated therewith.

6. The game result evaluation method according to claim 3,
wherein the concealing of the relationship includes indicating that a relationship between each characteristic parameter and each ability parameter is different for each character, and also includes outputting text data and/or audio data indicating that the relationship itself is concealed from the player.

7. An electronic game device that controls operation a game played by a player and includes a result evaluation, the electronic game device comprising:
    a game execution unit configured to compute a plurality of ability parameters of the player based on an execution of the game;
    a characteristic storing unit configured to store a plurality of characteristic parameters that are correlated with a plurality of characters respectively and used for displaying each character, and initial values thereof;
    a relationship storing unit configured to store for the each character a relationship between each of the plurality of characteristic parameters of the each character and the plurality of ability parameters computed by the game execution unit;

a characters displaying unit configured to display the plurality of characters based on the initial values of the characteristic parameters prior to the game execution by the game execution unit;

a relationship concealing unit configured to conceal from the player the relationship between the plurality of characteristic parameters and the plurality of ability parameters of each character displayed by the character displaying unit;

a selection accepting unit configured to accept a selection of any of the plurality of characters displayed by the character displaying unit;

a characteristic update unit configured to update a value of each of the characteristic parameters of a selected character based on the ability parameters of the player computed by the game execution unit and a relationship between the characteristic parameters of the selected character that is a character selected by the selection accepting unit and the ability parameters; and a result displaying unit configured to display the selected character that has visually changed from the selected character displayed by the character displaying unit as an execution result of the game based on the value of each of the characteristic parameters updated by the characteristic update unit.

8. A non-transitory computer-readable medium encoded with a game result evaluation program for causing a computer to function as:

a game execution unit for computing a plurality of ability parameters of a player based on an execution of a game;

a characteristic storing unit for storing a plurality of characteristic parameters that are correlated with a plurality of characters respectively and used for displaying each character, and initial values thereof;

a relationship storing unit for storing for the each character a relationship between each of the plurality of characteristic parameters of the each character and the plurality of ability parameters computed by the game execution unit;

a characters displaying unit for displaying the plurality of characters based on the initial values of the characteristic parameters prior to the game execution by the game execution means;

a relationship concealing unit for concealing from the player the relationship between the plurality of characteristic parameters and the plurality of ability parameters of each character displayed by the characters displaying unit;

a selection accepting unit for accepting a selection of any of the plurality of characters displayed by the character displaying unit;

a characteristic update unit for updating a value of each of the characteristic parameters of a selected character based on the ability parameters of the player computed by the game execution means and a relationship between characteristic parameters of the selected character that is a character selected by the selection accepting unit and the ability parameters; and a result displaying unit for displaying the selected character that has visually changed from the selected character displayed by the character displaying unit as an execution result of the game based on the value of each of the characteristic parameters updated by the characteristic update unit.

* * * * *